J. H. STORM.
PLOW CLEANING ATTACHMENT.

No. 190,165. Patented May 1, 1877.

Attest:
Levi D. Abrich
Robert Massey

Inventor:
James H. Storm
By Thomas J. Orwig, Atty.

UNITED STATES PATENT OFFICE.

JAMES H. STORM, OF MITCHELLVILLE, IOWA.

IMPROVEMENT IN PLOW-CLEANING ATTACHMENTS.

Specification forming part of Letters Patent No. 190,165, dated May 1, 1877; application filed July 25, 1876.

*To all whom it may concern:*

Be it known that I, JAMES H. STORM, of Mitchellville, in the county of Polk and State of Iowa, have invented a Plow-Cleaning Attachment, of which the following is a specification:

The object of my invention is to provide an attachment for plows, complete in itself, in such form that it can be readily applied and operated to gather and catch weeds in advance of the plow and standard and carry the same to one side, to be covered by the furrow-slice of soil cut loose by the advancing plow.

It consists in constructing and mounting a pendent swinging or oscillating guard or weed catcher and carrier in a bracket adapted to be fastened to the plow-beam, as hereinafter fully set forth.

Figure 1:
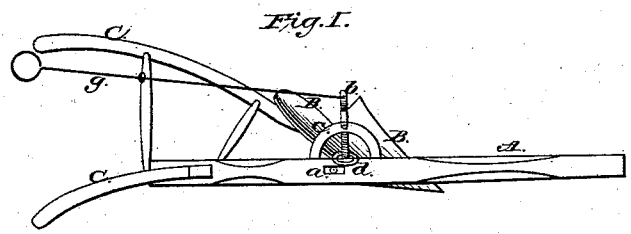

Figure 1 of my drawing is a top-plan view, illustrating the construction, application, and operation of my invention.

A is a plow-beam; B, the mold-board and share, and C C the handles. $a$ represents the plow-standard, which connects the mold-board, land-side, and plow-share with the beam. $b$ is my bent pendent and oscillating weed catcher and carrier. $c$ is a curved skeleton bracket, attached to the side of the plow-beam. $d$ is a metal spring, coiled on a vertical post, that extends through the top and bottom of the skeleton bracket and forms a bearing for the pivoted weed catcher and carrier $b$. $f$ is an elbow-form branch, rising from the horizontal portion of the weed-catcher $b$, and terminating in a bearing on the post that retains the spring $d$ in its place. $g$ is a rod and handle, linked to the free end and horizontal arm of the weed catcher and carrier $b$. It extends rearward, and rests upon the top plow-handle brace.

Figure 2:
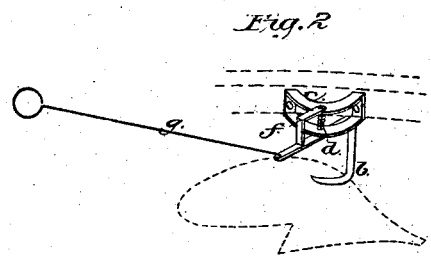
Figure 3:
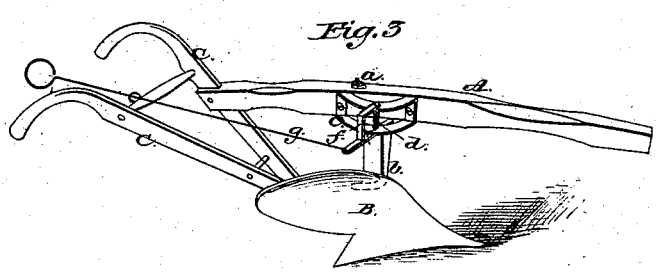

Fig. 2 is a perspective view of the complete attachment, ready to apply. Fig. 2 is a perspective view of a plow, showing my attachment applied.

To apply my attachment, simply pass screws or bolts through the perforations in the bracket $c$, and into or through the plow-beam.

The bracket $c$ may be made of wrought-iron, or cast complete in one piece of common or malleable iron.

In the practical operation of my attachment, the spring $d$ will hold and retain the vertical portion of the weed-catcher $b$ in its normal position, immediately in front of the standard $a$. The lower and rearwardly-curved end of it will bend rearward around the outside of the standard $a$. This lower curved and horizontal portion of the weed-catcher, standing rearward in its normal position, swings forward as it follows the vertical portion, and stands across the mold-board, to direct weeds toward that vertical part of the guard, and thereby prevent them from passing behind the guard while in the act of conveying matter to the side and rear of the plow-standard $a$. All weeds and obstructions met as the plow advances will come into contact with this pendent guard $b$ and adhere to it. Before enough matter has accumulated to become an obstruction, the plowman, by pulling rearward the handle $g$, can readily swing the guard and weed catcher and carrier $b$ to one side and throw off the adhering matter, to drop upon the furrow-slice that is turning and will fall inverted upon the matter deposited by the weed catcher and conveyer $b$.

The plow is thus readily kept free from becoming clogged with weeds, and the weeds and similar light obstructions are gathered and buried without interrupting the progress of the plow.

A simple, complete, and novel device is thus provided, that can be readily and advantageously applied and operated by any plowman or plowboy of ordinary intelligence and mechanical skill.

I claim as my invention—

As an improved article of manufacture, a plow-cleaning attachment, composed of the bent and pivoted weed-catcher $b$, having an elbow-form branch, $f$, and handle $g$, the skeleton bracket $c$, and the spring $d$, substantially as and for the purposes shown and described.

JAMES H. STORM.

Witnesses:
I. C. DAILEY,
J. A. HOGG.